(12) United States Patent
Hoffman

(10) Patent No.: US 6,425,029 B1
(45) Date of Patent: Jul. 23, 2002

(54) APPARATUS FOR CONFIGURING BUS ARCHITECTURE THROUGH SOFTWARE CONTROL

(75) Inventor: Robert R. Hoffman, Mounds View, MN (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/327,413

(22) Filed: Jun. 7, 1999

(51) Int. Cl.$^7$ ............................................. G06F 13/00
(52) U.S. Cl. ...................................... 710/104; 710/305
(58) Field of Search ............................... 710/305–317, 710/104, 105

(56) References Cited

U.S. PATENT DOCUMENTS

| | | | | |
|---|---|---|---|---|
| 5,379,384 A | * | 1/1995 | Solomon | 710/128 |
| 5,887,157 A | * | 3/1999 | Klein et al. | 395/500.44 |
| 5,911,149 A | * | 6/1999 | Luan et al. | 711/147 |
| 6,094,699 A | * | 7/2000 | Surugucchi et al. | 710/128 |
| 6,148,351 A | * | 11/2000 | Takase | 710/66 |
| 6,173,349 B1 | * | 1/2001 | Qureshi et al. | 710/110 |
| 6,311,245 B1 | * | 10/2001 | Klein | 710/126 |

* cited by examiner

Primary Examiner—Rupal Dharia
(74) Attorney, Agent, or Firm—Park, Vaughan & Fleming LLP

(57) ABSTRACT

One embodiment of the present invention provides a computer system that selectively switches a plurality of peripheral devices between a plurality of buses in order to improve computer system performance. This computer system includes a number of peripheral devices, including a first peripheral device and a second peripheral device, as well as a number of buses, including a first bus and a second bus. The computer system also includes a configuration register that receives bus configuration information from a processor executing a program. This bus configuration information specifies whether the first peripheral device is coupled to the first bus or the second bus, and whether the second peripheral device is coupled to the first bus or the second bus. The computer system also includes a switching mechanism that operates under control of the configuration register. This switching mechanism couples the first peripheral device to either the first bus or the second bus, and couples the second peripheral device to either the first bus or the second bus. In one embodiment of the present invention, the first bus is a shared bus coupled to more than one peripheral device and the second bus is a high-speed bus coupled to at most one peripheral device.

19 Claims, 3 Drawing Sheets

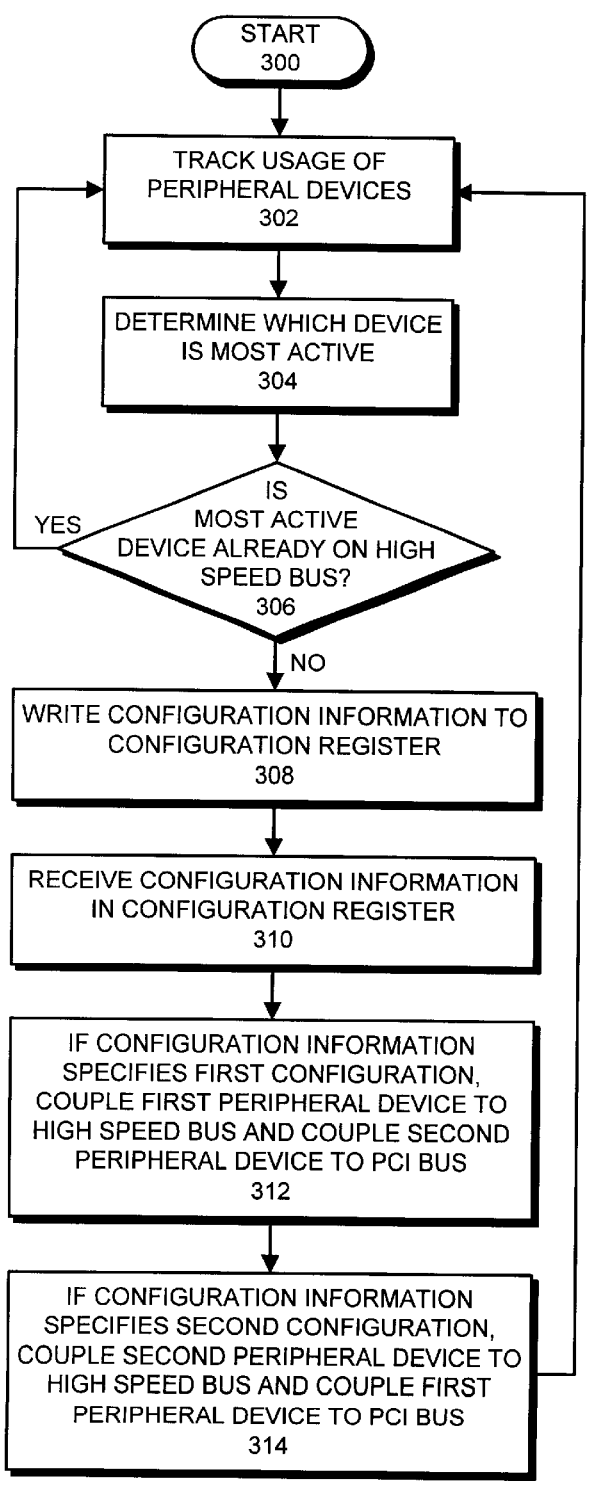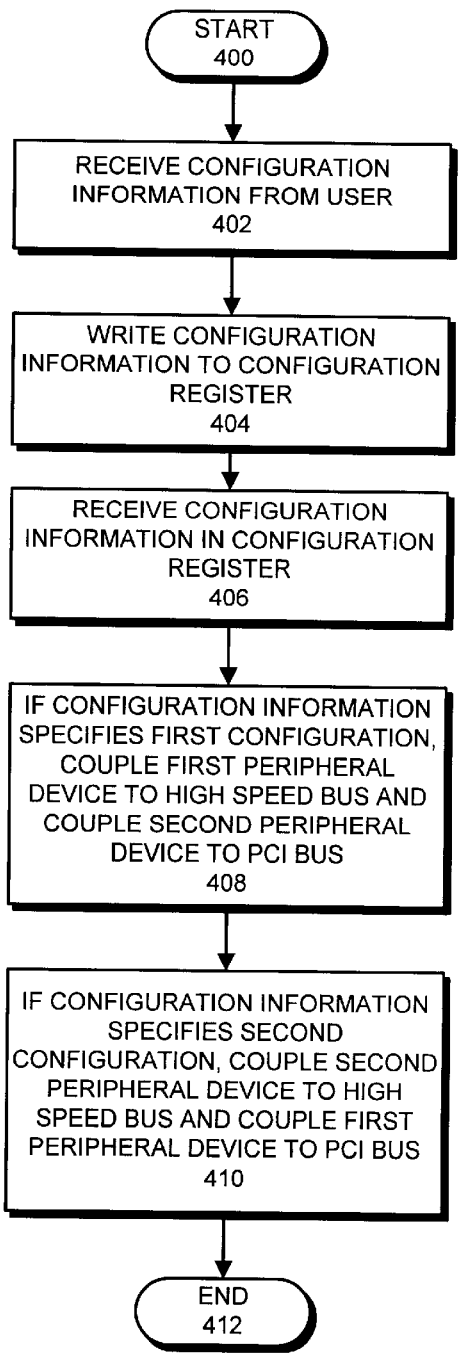
FIG. 3
FIG. 4

APPARATUS FOR CONFIGURING BUS ARCHITECTURE THROUGH SOFTWARE CONTROL

RELATED APPLICATION

The subject matter of this application is related to the subject matter in a co-pending non-provisional application by the same inventor(s) as the instant application and filed on the same day as the instant application entitled, "Method for Configuring Bus Architecture Through Software Control," having Ser. No. 09/327,412, and filing date Jun. 7, 1999.

BACKGROUND

1. Field of the Invention

The present invention relates to bus architectures for computer systems. More specifically, the present invention relates to a bus architecture that can be configured through software control to selectively switch peripheral devices between different buses in order to improve system performance.

2. Related Art

Computer systems typically communicate with peripheral devices through a peripheral bus that is shared between a number of peripheral devices. This arrangement works well for the majority of peripheral devices, because most peripheral devices make limited use of the peripheral bus. However, as the performance of computer systems and peripheral devices continues to increase, some peripheral devices are beginning to encounter performance problems caused by contention between peripheral devices for access to the shared peripheral bus.

In order to overcome these performance limitations, some computer systems use a separate dedicated high-speed bus to communicate with a peripheral device requiring a large amount of capacity from a peripheral bus. For example, some computer systems have a separate bus for communicating with a graphics accelerator—such as the AGP bus found in many personal computer systems. This architecture works well for computer systems that require large amounts of bus capacity for a particular task, such a processing graphical images. However, this architecture is also inflexible because once the computer system is configured to provide bus capacity for a particular peripheral device, such as a graphics accelerator, it cannot be reconfigured for other tasks that require large amounts of bus capacity for other peripheral devices. For example, a computer system that is used as a file server may require large amounts of bus capacity for accesses to a disk subsystem, and a computer system that is used as a network server may require large amounts of bus capacity for a network subsystem.

What is needed is a computer system with a bus architecture that can selectively provide dedicated bus capacity to more than one peripheral device.

SUMMARY

One embodiment of the present invention provides a computer system that selectively switches a plurality of peripheral devices between a plurality of buses in order to improve computer system performance. This computer system includes a number of peripheral devices, including a first peripheral device and a second peripheral device, as well as a number of buses, including a first bus and a second bus. The computer system also includes a configuration register that receives bus configuration information from a processor executing a program. This bus configuration information specifies whether the first peripheral device is coupled to the first bus or the second bus, and whether the second peripheral device is coupled to the first bus or the second bus. The computer system also includes a switching mechanism that operates under control of the configuration register. This switching mechanism couples the first peripheral device to either the first bus or the second bus, and couples the second peripheral device to either the first bus or the second bus.

In one embodiment of the present invention, the first bus is a shared bus coupled to more than one peripheral device and the second bus is a high-speed bus coupled to at most one peripheral device.

In one embodiment of the present invention, the apparatus additionally includes a tracking mechanism that gathers usage information from the first peripheral device and the second peripheral device, and determines from this usage information which one of the first peripheral device and the second peripheral device is most active. It also includes a writing mechanism that writes the configuration information into the configuration register to specify that the most active peripheral device is to be coupled to the second bus so that the most active peripheral device has exclusive access to the second bus.

In one embodiment of the present invention, the first peripheral device and the second peripheral device can include a video subsystem, a disk subsystem and a network subsystem.

BRIEF DESCRIPTION OF THE FIGURES

FIG. 3 is a flow chart illustrating the process of switching peripheral devices between buses in accordance with an embodiment of the present invention.

FIG. 4 is a flow chart illustrating the process of switching peripheral devices between buses in accordance with another embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a carrier wave. For example, the carrier wave may carry information across a communications network, such as the Internet.

Computer System

Figure 1:
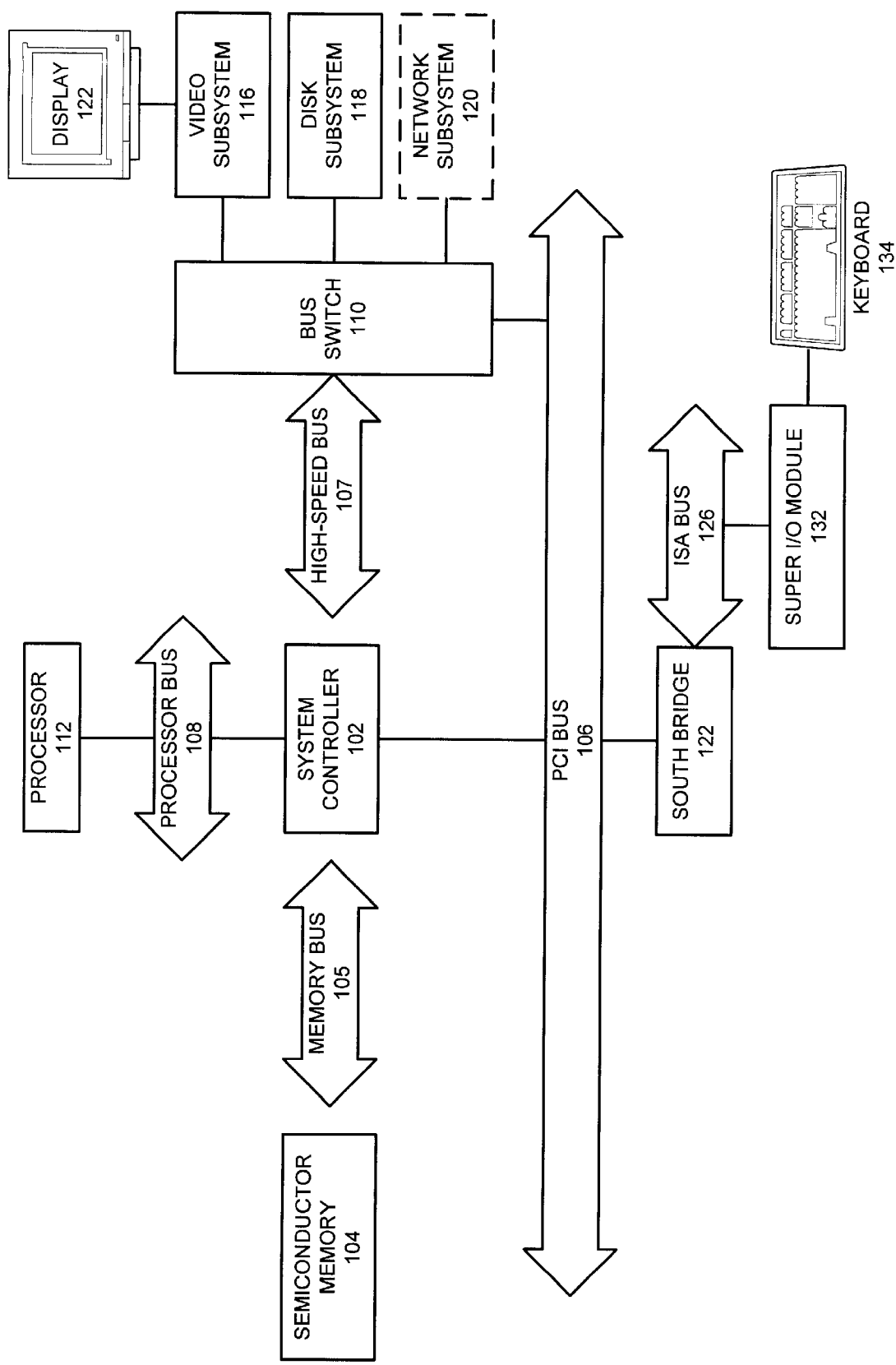
FIG. 1 illustrates a computer system in accordance with an embodiment of the present invention.

FIG. 1 illustrates a computer system in accordance with an embodiment of the present invention. The computer system illustrated in FIG. 1 is comprised of a number of components, including processor 112, system controller 102, semiconductor memory 104, bus switch 110, video subsystem 116, disk subsystem 118 and network subsystem 120. Processor 112 can include any type of computational device capable of performing computational operations in a computing system, including but not limited to a microprocessor, a mainframe processor, a device controller and a computing device in an appliance. Processor 112 is coupled to system controller 102 through processor bus 108. Processor bus 108 can include any type of communication channel for coupling together processors with system controller 102.

System controller 102 (also referred to as a core logic unit) includes circuitry for interconnecting computer system components. More specifically, system controller 102 couples together processor bus 108, memory bus 105, PCI bus 106 and high-speed bus 107.

Memory bus 105 couples system controller 102 with semiconductor memory 104. Semiconductor memory 104 can include any type of semiconductor memory for storing code and data to be executed by processor 112. Memory bus 105 can include any communication channel that supports accesses by processor 112 to semiconductor memory 104 through system controller 102.

PCI bus 106 couples system controller 102 to a number of PCI bus devices (not shown) and to bus switch 110. PCI bus 106 may include any type of general-purpose bus coupled to a number of peripheral devices. South bridge 122 is an additional core logic unit that couples PCI bus 106 to ISA bus 126. ISA bus 126 couples south bridge 122 to a number of ISA bus devices, including super I/O module 132. Super I/O module 132 includes circuitry to facilitate communications with I/O devices, including but not limited to a floppy disk, a serial port, a parallel port, a mouse and a keyboard 134.

Bus switch 110 includes circuitry for switching peripheral devices between high-speed bus 107 and PCI bus 106. Hence, any peripheral device coupled to bus switch 110 can either be coupled with high-speed bus 107 or PCI bus 106. High-speed bus 107 is a dedicated bus that is coupled to at most one selected peripheral device. This allows the selected peripheral device to communicate with system controller 102 and the rest of the computer system without interference from other peripheral devices. Note that PCI bus 106 is shared between multiple peripheral devices and hence communications across PCI bus 106 periodically suffer from contention problems between peripheral devices.

Bus switch 110 is coupled to a number of peripheral devices including video subsystem 116, disk subsystem 118 and network subsystem 120. Video subsystem 116 includes any type of circuitry for processing images for display on a computer monitor. This includes circuitry for performing graphics acceleration and/or frame buffering Video subsystem 116 outputs images to display 122. Disk subsystem 118 may include any type of controller coupled to at least one secondary storage device, such as a disk drive. Network subsystem 120 may include any type of circuitry for handling communications to and from a computer network. For example, network subsystem 120 may include a network interface controller (NIC).

At most one peripheral device at a time is coupled to high-speed bus 107; the other devices are coupled to PCI bus 106. For example, when a graphics-intensive application requires a large amount of bus bandwidth, video subsystem 116 is coupled to high-speed bus 107. When a database or file system application requires a large amount of disk bandwidth, disk subsystem 118 is coupled to high-speed bus 107. Finally, when network communications require a large amount of network bandwidth, network subsystem 120 is coupled to high-speed bus 107. In this way, peripheral devices that require large amounts of bus bandwidth can be selectively coupled to high-speed bus 107.

Switching Circuitry

Figure 2:
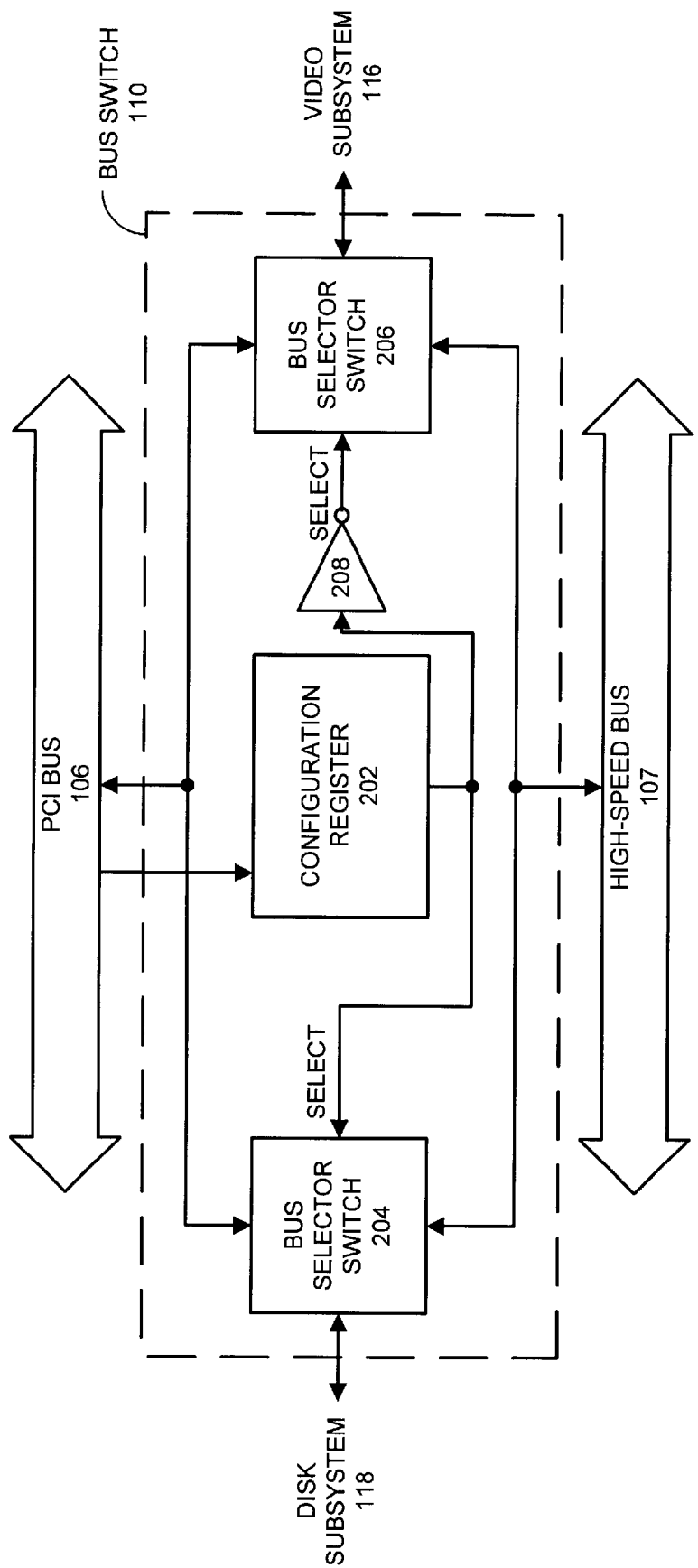
FIG. 2 illustrates switching circuitry to switch peripheral devices between different buses in accordance with an embodiment of the present invention.

FIG. 2 illustrates switching circuitry within bus switch 110 to switch peripheral devices between PCI bus 106 and high-speed bus 107 in accordance with an embodiment of the present invention. The switching circuitry illustrated in FIG. 2 can accommodate only two peripheral devices, disk subsystem 118 and video subsystem 116. However, note that this architecture can expand to accommodate more than two peripheral devices.

Bus switch 110 includes bus selector switch 204, bus selector switch 206 and configuration register 202. Configuration register 202 resides in the address space of PCI bus 106 and can be written to by a program that performs a write operation across PCI bus 106. Configuration register 202 contains configuration information that specifies which peripheral device is coupled to high-speed bus 107 and which peripheral device is coupled to PCI bus 106. In the illustrated embodiment, configuration register 202 contains a single bit that indicates whether disk subsystem 118 or video subsystem 116 is coupled to high-speed bus 107. If bus switch 110 is coupled to more than two peripheral devices, additional bits of configuration information are required to select a peripheral device to be coupled to high-speed bus 107.

Note that the single bit within configuration register 202 is coupled directly to bus selector switch 204 and is coupled through inverter 208 to bus selector switch 206. This means that bus selector switch 206 makes the opposite selection from bus selector switch 204. Hence, if bus selector switch 204 couples disk subsystem 118 to high-speed bus 107, bus selector switch 206 couples video subsystem 116 to PCI bus 106. Conversely, if bus selector switch 204 couples disk subsystem 118 to PCI bus 106, bus selector switch 206 couples video subsystem 116 to high-speed bus 107. In one embodiment of the present invention, bus selector switches 204 and 206 are implemented using the SN74CBT16233 16-bit 1-of-2 FET multiplexer/demultiplexer chip distributed by Texas Instruments of Dallas, Tex.

Process of Switching Peripheral Devices Between Buses

FIG. 3 is a flow chart illustrating the process of switching peripheral devices between buses in accordance with an embodiment of the present invention. First, the system tracks usage of peripheral devices (step 302). In one embodiment of the present invention, this tracking includes storing usage information for peripheral devices in a usage register within bus switch 110. Alternatively, usage information can be maintained within an operating system or an application program in semiconductor memory 104. This usage information can include any type of usage statistic for peripheral devices, including the number of bus accesses each peripheral device makes or to total amount of bus bandwidth used by each peripheral device.

The system uses the usage information to determine which one of the peripheral devices in the system is "most active" (step 304). This "most active" peripheral device may be the peripheral device that makes the largest number of requests for the bus or uses the most bus bandwidth. Alternatively, the most active peripheral device may be the peripheral device that can least tolerate bus contention. For example, a network interface may require fast accesses to a peripheral bus to prevent buffer overflow, even though the total volume of bus traffic generated by the network interface device is quite small.

Next, the system determines if the most active peripheral device is already coupled to the high-speed bus 107. If so, the system returns to step 302 to continue tracking of peripheral device usage. If not, the system writes configuration information to configuration register 202 to change the configuration of the bus architecture (step 308).

Next, this configuration information is received in configuration register 202 (step 310). From configuration register 202, this configuration information feeds into select inputs of bus selector switches 204 and 206. This configuration information can cause a number of things to happen. If the configuration information specifies a first configuration, disk subsystem 118 is coupled to high-speed bus 107 and video subsystem 116 is coupled to PCI bus 106 (step 312). This provides a high performance bus linkage to disk subsystem 118. If the configuration information specifies a second configuration, video subsystem 116 is coupled to high-speed bus 107 and disk subsystem 118 is coupled to PCI bus 106 (step 314). This provides a high performance bus linkage to video subsystem 116.

In another embodiment of the present invention, if the configuration information specifies a third configuration, video subsystem 116 and disk subsystem 118 are both coupled to PCI bus 106. This third configuration can be used in the case where high-speed bus 107 fails. It can also be used if another peripheral device besides disk subsystem 118 and video subsystem 116 has access to high-speed bus 107.

In one embodiment of the present invention, the system waits for outstanding bus cycles to complete before switching the first peripheral device or the second peripheral device.

FIG. 4 is a flow chart illustrating the process of switching peripheral devices between buses in accordance with another embodiment of the present invention. In this embodiment, the configuration information is received from a computer system user through a user interface (step 402). This allows the computer system user to manually select which peripheral device has access to high-speed bus 107. The remaining steps 404 through 410 are identical to steps 308 through 314 described above.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. An apparatus that selectively switches a plurality of peripheral devices between a plurality of buses in order to improve computer system performance, comprising:
   a first peripheral device;
   a second peripheral device;
   a first bus;
   a second bus;
   a configuration register for storing configuration information specifying whether the first peripheral device is coupled to the first bus or the second bus, and whether the second peripheral device is coupled to the first bus or the second bus, the configuration register being configured to receive the configuration information from a processor executing a program;
   a switching mechanism operating under control of the configuration register for coupling the first peripheral device to either the first bus or the second bus, and for coupling the second peripheral device to either the first bus or the second bus; and
   a tracking mechanism that is configured to track a usage of the first peripheral device and the second peripheral device and to determine which one of the first peripheral device and the second peripheral device is most active; and
   a writing mechanism that writes the configuration information to the configuration register to specify that the most active peripheral device is to be coupled to the second bus so that the most active peripheral device has exclusive access to the second bus.

2. The apparatus of claim 1, wherein the first bus is a shared bus coupled to more than one peripheral device and the second bus is a high-speed bus coupled to at most one peripheral device.

3. The apparatus of claim 1, wherein the tracking mechanism includes at least one usage register for storing usage information for the first peripheral device and the second peripheral device.

4. The apparatus of claim 1, wherein the switching mechanism is configured to wait for outstanding bus cycles to complete before switching the first peripheral device or the second peripheral device.

5. The apparatus of claim 1, wherein the first peripheral device is one of a video subsystem, a disk subsystem and a network subsystem.

6. The apparatus of claim 1, wherein the first bus includes a PCI bus.

7. The apparatus of claim 1, further comprising an initialization mechanism that is configured to write initial configuration information into the configuration register during a system startup process.

8. The apparatus of claim 1, wherein the switching mechanism includes a one-of-two multiplexer/demultiplexer that selectively couples the first peripheral device to either the first bus or the second bus.

9. The apparatus of claim 1, further comprising an input receiving mechanism that receives the configuration information from a user, and stores the configuration information in the configuration register.

10. An apparatus that selectively switches a plurality of peripheral devices between a plurality of buses in order to improve computer system performance, comprising:
   a first peripheral device;
   a second peripheral device;
   a first bus;
   a second bus;
   wherein the first bus is a shared bus coupled to more than one peripheral device and the second bus is a high-speed bus coupled to at most one peripheral device;
   a configuration register for storing configuration information specifying whether the first peripheral device is coupled to the first bus or the second bus, and whether the second peripheral device is coupled to the first bus or the second bus, the configuration register being configured to receive the configuration information from a processor executing a program; and
   a switching mechanism operating under control of the configuration register for coupling the first peripheral device to either the first bus or the second bus, and for coupling the second peripheral device to either the first bus or the second bus;

a tracking mechanism that is configured to track a usage of the first peripheral device and the second peripheral device and to determine which one of the first peripheral device and the second peripheral device is most active; and a writing mechanism that writes the configuration information to the configuration register to specify that the most active peripheral device is to be coupled to the second bus so that the most active peripheral device has exclusive access to the second bus.

11. The apparatus of claim 10, wherein the tracking mechanism includes at least one usage register for storing usage information for the first peripheral device and the second peripheral device.

12. The apparatus of claim 10, wherein the switching mechanism is configured to wait for outstanding bus cycles to complete before switching the first peripheral device or the second peripheral device.

13. The apparatus of claim 10 wherein the first peripheral device is one of a video subsystem, a disk subsystem and a network subsystem.

14. The apparatus of claim 10, wherein the first bus includes a PCI bus.

15. The apparatus of claim 10, further comprising an initialization mechanism that is configured to write initial configuration information into the configuration register during a system startup process.

16. The apparatus of claim 10, wherein the switching mechanism includes a one-of-two multiplexer/demultiplexer that selectively couples the first peripheral device to either the first bus or the second bus.

17. The apparatus of claim 10, further comprising an input receiving mechanism that receives the configuration information from a user, and stores the configuration information in the configuration register.

18. A computer system including an apparatus that selectively switches a plurality of peripheral devices between a plurality of buses in order to improve computer system performance, comprising:

a central processing unit;

a semiconductor memory;

a first peripheral device;

a second peripheral device;

a first bus;

a second bus;

a configuration register for storing configuration information specifying whether the first peripheral device is coupled to the first bus or the second bus, and whether the second peripheral device is coupled to the first bus or the second bus, the configuration register being configured to receive the configuration information from a processor executing a program;

a switching mechanism operating under control of the configuration register for coupling the first peripheral device to either the first bus or the second bus, and for coupling the second peripheral device to either the first bus or the second bus; and a tracking mechanism that is configured to track a usage of the first peripheral device and the second peripheral device and to determine which one of the first peripheral device and the second peripheral device is most active; and a writing mechanism that rites the configuration information to the configuration register to specify that the most active peripheral device is to be coupled to the second bus so that the most active peripheral device has exclusive access to the second bus.

19. The apparatus of claim 18, wherein the first peripheral device is one of a video subsystem, a disk subsystem and a network subsystem.

* * * * *